United States Patent Office 3,649,596
Patented Mar. 14, 1972

3,649,596
POLYAMIC ACID FROM TRICYCLO-(4.2.2.0$^{2,5}$)-
DEC-7-ENE - 3,4,9,10 - TETRACARBOXYLIC
DIANHYDRIDE
Shaler G. Smith, Jr., Claymont, Del., assignor to E. I. du
Pont de Nemours and Company, Wilmington, Del.
No Drawing. Filed Aug. 5, 1964, Ser. No. 387,778
Int. Cl. C08g 20/32
U.S. Cl. 260—47 CP  6 Claims

ABSTRACT OF THE DISCLOSURE

Polymeric acid compositions comprising the reaction product of an organic diamine and a tricyclic tetracarboxylic dianhydride having the structural formula,

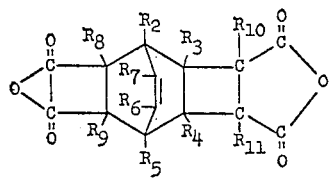

wherein $R_2$ through $R_7$ are individually selected from the group consisting of hydrogen, $C_1$ to $C_6$ alkyl, chlorine, and fluorine; and $R_8$ through $R_{11}$ are individually selected from the group of hydrogen, methyl, chlorine and fluorine. The polyamic acid compositions are useful as coating compositions, particularly for wire coatings.

---

This invention relates to prepolymers prepared from tricyclic tetracarboxylic dianhydrides and to polyimides prepared from these dianhydrides.

Certain polyamic acids have outstanding physical and chemical properties which make them extremely useful for shaping into useful structures by coating on various substrates, casting as films, extruding through dies or by similar processing. Such prepolymer structures can be converted by heating or by chemical means to polyimide structures, polyamide acid salt structures and polyamide acid ester structures which are characterized by properties even more desirable than those of the polyamic acids. Polyimides resulting from conversion of applied polyamic acid coatings exhibit advantageous electrical properties which makes these polymers particularly interesting as high temperature electrical insulation.

Solutions of polyamic acids in organic solvents are particularly useful as coating compositions because they are convenient to use in many applications. However, solutions of these convertible polyamic acids frequently have a high initial viscosity and are not usually stable in viscosity. Lack of adequate viscosity stability in the package presents a problem in using polyamic acid solutions commercially having a high initial viscosity. Such polyamic acid solutions sometimes gel during a short period of storage. Therefore, such solutions must be applied as a coating or converted to a shaped article promptly after preparation of the solution or some means used to compensate for its high viscosity, prior to gelation, as, for example, by use of additional solvent. Such compensating reduction in the polyamic acid content of the solution reflects a lower build of the coating per coat and thus requires an increased number of coats to achieve the desired coating thickness. This need for additional solvent and for additional applied coats adds to the cost of applying a unit amount of the polyamic acid. In commercial practice, a typical solution of polyamic acid, having approximately 16.5% concentration, exhibits about 100% increase in viscosity in 4 to 5 weeks and gels in about 11 weeks at 38° C. with a viscosity of about 1300 poises.

The solution is recognized as unusable for coating when the viscosity has significantly exceeded 100 poises. On the other hand, known polyamic acid solutions having medium viscosities are not only beset with instability in viscosity, that is, the tendency to increase in viscosity fairly rapidly, but also usually produce lower quality polyimide coatings than desirable.

In accordance with this invention there is provided a polyamic acid composition characteriezd by surprisingly low initial viscosity and acceptable viscosity stability in addition to the unusually outstanding properties of polyamic acid solutions. The instant polyamic acid compositions not only have a low initial viscosity but produce polyimides of a quality substantially superior to polyimides produced from known polyamic acid solutions having comparable initial viscosity.

The polyamic acid composition of this invention, like known polyamic acid solutions referred to above, can be converted by heating to a polyimide but unlike many polyamic acid solutions above, possess a usable viscosity over a longer period of time. This property contributes greatly to the usefulness of this composition in that, unlike some of the polyamic acids referred to above, it need not be converted as quickly to a polyimide. Moreover, the relatively low initial viscosity of the composition of this invention permits easy working and use in applications where similar materials of higher viscosity are not suitable.

The polyamic acid composition of this invention contains essentially a polymer characterized by repeating units having the following structural formula:

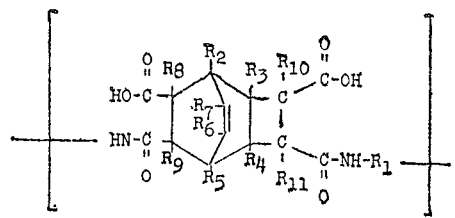

(1)

wherein $R_2$, $R_3$, $R_4$, $R_5$, $R_6$ and $R_7$ (hereinafter referred to collectively and individually as $R_2$-$R_7$) can be hydrogen, ($C_1$-$C_6$)-alkyl, Cl and F. Preferably not more than two of $R_2$-$R_7$ are alkyl groups. $R_8$, $R_9$, $R_{10}$ and $R_{11}$ (hereinafter referred to individually and collectively as $R_8$-$R_{11}$) can be hydrogen, methyl, phenyl, Cl or F. The double bond between the carbons bearing $R_6$ and $R_7$ may be replaced by a H atom on each of these carbons. $R_1$ is a divalent radical originating from at least one organic diamine having the structural formula $H_2N$—$R_1$—$NH_2$ where $R_1$ contains at least two carbon atoms and each of the two amino groups is attached to separate carbon atoms of $R_1$, which can be aliphatic, aromatic, alicyclic or contain a plurality of such radicals.

The low viscosity stable polyamic acid composition of this invention is prepared by reacting an organic diamine having the structural formula $H_2N$—$R_1$—$NH_2$ with a tricyclic tetracarboxylic dianhydride formed by reacting two molecules of maleic anhydride or a substituted maleic anhydride with benzene or a substituted benzene. This class of dianhydrides (referred to as $M_2B$) has the following structural formula:

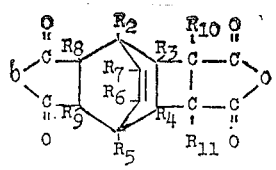

(2)

wherein $R_2$–$R_7$ and $R_8$–$R_{11}$ have the same significance as in Formula 1.

A preferred polyamic acid composition is prepared from a dianhydride having the above structural formula in which $R_2$–$R_{11}$ are hydrogen. This dianhydride is referred to more exactly as tricyclo-(4.2.2.0$^{2,5}$)-dec-7-ene-3,4,9,10-tetracarboxylic dianhydride.

One method for preparing the above dianhydride is disclosed in Chemistry and Industry, Dec. 8, 1962, page 2060 by Dr. Bryce-Smith et al. While this method is particularly directed to production of a dianhydride in which $R_2$–$R_{11}$ are hydrogen, the corresponding dianhydrides in which $R_2$–$R_7$ are one or another of hydrogen, ($C_1$–$C_6$)-alkyl, Cl, F, etc., and $R_8$–$R_{11}$ are one or another of hydrogen, methyl, phenyl, Cl or F, can generally be prepared in the same manner by using an appropriate substituted benzene and/or substituted maleic anhydride. Alternate routes can also be used. Preparation of the substituted benzenes and substituted maleic anhydrides is well known in the art.

The reaction on $M_2B$ with an organic diamine in accordance with this invention is carried out in an organic solvent for at least one of the reactants, the solvent being inert to the reactants and preferably anhydrous. The reaction is carried out by heating the reactant at a temperature below 80° C. but of course reaction temperature and reaction period will vary with the particular combination of reactants used and the particular solvent used. The reaction is exothermic and therefore the reaction temperature is selected to adequately control polyamic acid formation so that at least 50% by weight of the polymer structural units have the indicated polyamic acid structure and less than 50% have the structure of the corresponding polyimide. Unlike other diamine/dianhydride reactions producing polyamic acids the process of the instant invention is unique and does not go to completion rapidly under the reaction conditions used, and the polyamic acid compositions of this invention usually contain 1–10% by weight of the unreacted dianhydride (or anhydride groups equivalent thereto), usually about 4% on this basis. Even when excess of the diamine reactant is employed to give polymers with a different balance of properties, the polyamic acid composition still contains significant unreacted anhydride. When conversion to polyimide is desired immediately, however, higher temperatures are utilized than would otherwise be the case or a longer reaction time is permitted.

The particular reaction time to be used in any given instance can be determined by periodically measuring the viscosity of the reaction mixture. The reaction period may be as short as one minute but it is usually convenient to select reaction conditions which provide a reaction period in the range of about 30 to about 500 minutes. For the development of maximum useful viscosities and optimum polyamic acid composition properties, it is usually desirable to conduct the reaction at a temperature below 80° C., preferably no greater than about 50° C. until the viscosity reaches the desired level.

The polyamic acid composition of this invention has an initial solution viscosity of less than about 30 poises at a concentration of 15% solids in dimethylformamide, dimethylacetamide, N-methylpyrrolidone, dimethyl sulfoxide or mixtures thereof. The viscosity in relatively poorer solvents such as m-cresol and cresylic acid is usually somewhat higher.

The reactants usually are in equimolar proportions but can range up to 5% excess of either reactant. More than this excess of either reactant results in undesirably low molecular weight polyamic acid or other disadvantages. It is usually desirable for the excess of either reactant not to exceed about 3%. Besides use of such an excess of either reactant to control the molecular weight of the polymer, a chain-terminating agent may be used to "cap" the ends of the polymer chains, e.g., phthalic anhydride can be used for this purpose. However, when some component of the polymer contains an aromatic carbonyl group as described in copending U.S. patent application Ser. No. 320,937, filed Nov. 1, 1963 by J. R. Chalmers et al., now abandoned, excess of the diamine may be used.

The $M_2B$ type dianhydride may be blended with up to 50% by weight, based on $M_2B$, of other dianhydrides if desired. Suitable dianhydrides are 3,3',4,4'-benzophenonetetracarboxylic dianhydride,
pyromellitic dianhydride,
3,3',4,4'-diphenyltetracarboxylic dianhydride,
1,2,5,6-naphthalenetetracarboxylic dianhydride,
2,2',3,3'-diphenyltetracarboxylic dianhydride,
4,4'-isopropylidenediphthalic anhydride,
4,4'-sulfonyl-diphthalic anhydride,
3,4,9,10-perylenetetracarboxylic dianhydride,
4,4'-oxydiphthalic anhydride,
1,2,4,5-naphthalenetetracarboxylic dianhydride,
1,4,5,8-naphthalenetetracarboxylic dianhydride,
2,3,6,7-naphthalenetetracarboxylic dianhydride,
3,3'-isopropylidene-diphthalic anhydride,
3,3'-ethylidine diphthalic anhydride,
4,4'-ethylidene diphthalic anhydride,
3,3'-methylene diphthalic anhydride,
4,4'-methtylene diphthalic anhydride,
mellophanic dianhydride,
2,3,5,6-pyrazinetetracarboxylic dianhydride,
2,3,4,5-thiophenetetracarboxylic dianhydride,
4,4'-biphthalic anhydride,
3,3'-biphthalic anhydride,
2,3,4,5-pyrrolidonetetracarboxylic dianhydride,
1,4-dimethyl-7,8-diphenylbicyclo(2.2.2)oct-7-ene-2,3,5,6-tetracarboxylic dianhydride,
1,4,7,8-tetrachlorobicyclo(2.2.2)oct-7-ene-2,3,5,6-tetracarboxylic dianhydride,
7,8-diphenylbicyclo(2.2.2)oct-7-ene-2,3,5,6-tetracarboxylic dianhydride,
1,8-dimethyl dicyclo(2.2.2)oct-7-ene-2,3,5,6-tetracarboxylic dianhydride,
1,2,3,4-cyclopentanetetracarboxylic dianhydride.

Other dianhydrides which are useful include, in addition to 3,3',4,4'-benzophenonetetracarboxylic dianhydride and its position isomers, the following:

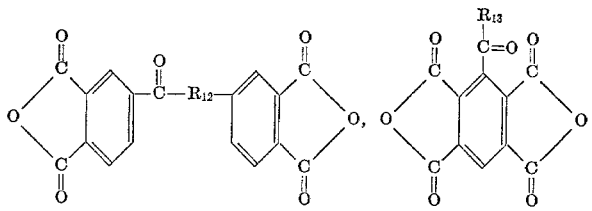

where $R_{12}$ is alkylene, arylene, etc., and $R_{13}$ is alkyl.

The proportion of organic solvent used in the reaction need only be sufficient to dissolve enough of one reactant, preferably to dissolve the diamine, to initiate the reaction of the diamine and the dianhydride. For forming the polyamic acid composition into shaped articles, most successful results are obtained when the solvent component constitutes at least 50% of the final composition solution, i.e., the solution may contain from 0.05 to 50% of the polymer component. For coating purposes, the content of polyamic acid usually is in the range of 5% to 40%.

Useful organic diamine reactants for preparing the polyamic acids are characterized by the general formula $H_2N'$—$R_1$—$NH_2$ wherein —$R_1$— is as heretofore defined and may be carbocyclic aromatic, saturated aliphatic alicyclic, a bridged organic radical wherein the bridging moiety is oxygen, nitrogen, sulfur, silicon or phosphorus and substituted groups thereof. Preferred diamines contain at least six carbon atoms and preferably include a structure characterized by benzenoid unsaturation. These preferred diamines having benzenoid unsaturation may be further characterized by —R'— being identified by one of the following structures:

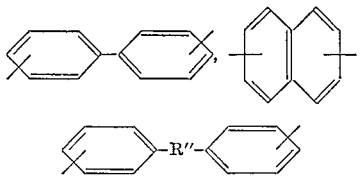

wherein the moiety —R"— can be an alkylene chain of 1 to 3 carbon atoms, —O—, —S—, —SO$_2$—, and

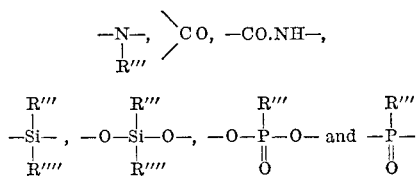

wherein —R'''— and —R''''— are selected from the group consisting of alkyl and aryl. The following species of diamines are typical of suitable diamine reactants for practicing the invention:

4,4'-oxydianiline
4,4'-methylenedianiline
4,4'-isopropylidenedianiline
meta-phenylene diamine
para-phenylene diamine
4,4'-sulfonyldianiline
benzidine
4,4'-thiodianiline
3,3'-sulfonyldianiline
4,4'-phosphinicodianiline
4,4'-(diethylsilylene) dianiline
m-xylylene diamine
p-xylylene diamine
1,6-hexanediamine
1,7-heptanediamine
1,8-octane diamine
1,9-nonane diamine
1,10-decane diamine
1,12-dodecane diamine
2,11-dodecane diamine
3-methylheptane-1,7-diamine
4,4-dimethylheptane-1,7-diamine
2,2-dimethylpropane-1,3-diamine
2,5-dimethyl hexane-1,6-diamine
2,5-dimethyl heptane-1,7-diamine
5-methyl nonane-1,9-diamine
1,12-octadecane diamine
1,4-cyclohexane diamine
1,5-naphthalene diamine
3,3'-dimethyl benzidine
2,4-bis-(beta-amino-t-butyl)toluene
4,4'-oxybis(β-phenyl-t-butylamine)
para-bis-(2-methyl-4-amino-pentyl)benzene
para-bis-(1,1-dimethyl-5-amino-pentyl)benzene
4,4'-methylenedicyclohexylamine
1,2-bis-(3-amino-propoxy)ethane
3-methoxyhexane-1,6-diamine
bis-(4-amino-phenyl)-N-methylamine
3,3'-dimethoxy benzidine
H$_2$N(CH$_2$)$_3$O(CH$_2$)$_2$O(CH$_2$)$_3$NH$_2$
H$_2$N(CH$_2$)$_3$S(CH$_2$)$_3$NH$_2$
H$_2$N(CH$_2$)$_3$NCH$_3$)(CH$_2$)$_3$NH$_2$
4,4'-diaminobenzophenone Mixtures of these species of the diamine can be used to provide copolyamic acid compositions.

The polyamic acid composition of this invention has exceptionally low initial viscosity but is readily converted to polyimides by heating at elevated temperatures greater than about 100° C. These polyimides have the following structural formula:

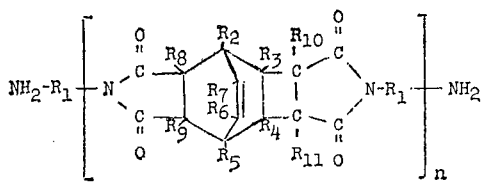

(3)

where R$_1$, R$_2$–R$_7$ and R$_8$–R$_{11}$ have the same meanings as in Formula 1. The molecular weight of these polymers is at least about 8000.

Solvents which are useful in synthesizing the polyamic acid compositions of this invention by solution polymerization are substantially inert organic liquids, other than either of the polymer-forming reactants or homologs thereof, which constitute a solvent for at least one of the reactants, and which may contain functional groups, the functional groups being groups other than monofunctional primary and secondary amino groups and other than monofunctional anhydride groups. Preferably the solvent is characterized by solvency for both of the reactants and, preferably, also by solvency for the polyamic reaction product. A particularly useful class of solvents are the normally liquid N,N-dialkylcarboxylamides of which the lower molecular weight species are preferred, e.g., N,N-dimethylformamide and N,N-dimethylacetamide. These solvents can be easily removed from the polyamic acid composition, coatings thereof and shaped articles thereof by evaporation, displacement or diffusion. Other useful solvents of this class are: N,N-diethylformamide, N,N-diethylacetamide and N,N-dimethoxyacetamide. Other typical useful solvents which may be used alone or in combination with these N,N-dialkylcarboxylamides include: N-methylcaprolactam, N-methyl-2-pyrrolidone, N-acetyl-2-pyrrolidone, dimethyl sulfoxide, tetramethyleneurea, pyridine, dimethyl sulfone, tetramethylene sulfone, formamide, N-methylformamide, m-cresol and cresylic acid and hexamethylphosphoramide. These more active solvents can be used in combination with poor solvents such as dioxane, butyrolactone, benzonitrile, benzene, toluene, xylene and cyclohexane.

The procedure for reacting the diamine and tetracarboxylic acid dianhydride to produce the polyamic acid composition can be carried out by any of several methods. One technique is to premix equimolar proportions of the two reactants as dry solids and then add the uniform dry mixture, in small proportions and with agitation, to the organic solvent, controlling the temperature and rate of the process to a reaction temperature below a predetermined value which minimizes conversion of the polyamic acid to polyimide, preferably below 50° C. Alternatively, the solvent can be added to the mixture of the reactants. Another method is to dissolve the diamine in the solvent, while agitating and preheating the solution to an elevated temperature, and then to add the dianhydride at a rate adequate to control the ultimate maximum reaction temperature. Still another method is to add the respective reactants in small portions to the solvent individually and alternately, i.e., first diamine, then dianhydride, then diamine, etc. A further process comprises dissolving the diamine in a portion of the solvent and the dianhydride in a second portion of the same or another solvent and then mixing the respective solutions of reactants. Combinations of these methods can also be used to advantage. For example, the polyamic acid composition can be prepared by a first stage solution polymerization in which the dianhydride either in dry solid form or in solution is added incrementally to a solution of the diamine followed by a second stage in which a mixture of the dry solid reactants is slowly added to the solution of the polyamic acid resulting from the first stage reaction.

The reaction is controlled to provide a polyamic acid having an inherent viscosity of at least 0.1, preferably in the range of 0.2 to 2, based on a solution of 0.5% by weight of the polyamic acid in N,N-dimethylacetamide usually at 25° C. Other active solvents can be used in lieu of the N,N-dimethylacetamide. The viscosity of the dilute solution of the polyamic acid is measured relative to viscosity of the solvent alone and the inherent viscosity is calculated on the basis of:

$$\text{Inherent Viscosity} = \frac{\text{natural logarithm}\left(\frac{\text{Viscosity of solution}}{\text{Viscosity of solvent}}\right)}{C}$$

where C is the concentration of the polyamic acid in solution expressed as grams of polymer per 100 milliliters of solution.

For coating and impregnating purposes, the solution of polyamic acid is adjusted in the proportion of volatile solvent and polyamic acid content to provide the solution with application properties conforming with the particular technique of application. The polymer solution may be pigmented with inert pigments, e.g., titanium dioxide, in usual proportions ordinarily ranging from 5 to 200 parts per 100 parts of the polymer. It is necessary that the pigment be substantially inert so that it does not react with the polyamic acid composition.

The polyamic acid compositions can be applied to a variety of substrates, for example, to metals, e.g., copper, brass, aluminum, steel, etc., in the form of sheet metal, fibers, wires, screening; glass in the form of sheets, fibers, foams, fabrics, etc.; polymeric materials, e.g., cellulosic materials, such as cellophane, paper wood; polyolefins, e.g., polyethylene, polypropylene, polystyrene; polyamides, polyvinylacetals, polyesters, e.g., polyethylene terephthalate; polyuretanes; perfluorocarbon polymers, e.g., polytetrafluoroethylene, tetrafluoroethylene/hexafluoropropylene copolymers, such polymeric materials being in the form of sheets, fibers, foams, woven and nonwoven fabrics, screening, coatings, leather sheets, etc. The invention solutions are particularly useful for depositing a coating of polyamic acid on wire and converting the deposited coating to polyimide having advantageous electrical insulating properties. Combination coatings may have either a primer, intermediate or topcoat layer provided by the invention composition, the remaining layers being provided by one or more of the aforementioned film-forming materials.

Presence of the polymer, i.e., the polyamic acid, in the final composition is determined by infrered adsorption spectra. The spectra therefore are characterized by an adsorption band at about 3.1 microns due to the N—H bond of the amide groups, at about 5.8 microns due to the C=O bond of the carboxyl groups, and at about 6.0 microns due to the C=O bond of the amide groups. The spectra also show bands at 5.4 and 5.6–5.7 microns representing anhydride groups.

The following examples illustrate the invention. All parts are by weight.

EXAMPLE 1

A quantity of 4,4′ - oxydianiline (40 parts) is dissolved in 284.4 parts N-methylpyrrolidone. The solution is stirred in a reaction vessel equipped with a thermometer and with means for cooling. About 54.8 parts of tricyclo-(4.2.2.0$^{2,5}$) - dec - 7 - ene - 3,4,9,10 - tetracarboxylic dianhydride are added at a rate to maintain the temperature of the mixture slightly below 35° C. When the solution becomes homogeneous, the viscosity is measured at 25° C. and found to be 1.5 poises at 15% solids (in N-methylpyrrolidone). The inherent viscosity of the reaction product, measured at a concentration of 0.5 g. solids/100 ml. after dilution with dimethylacetamide, is 0.5.

Films are cast on glass and copper panels, using the above mentioned homogeneous solution and a 7 - mil doctor knife. These are baked 5 minutes at 100° C. followed by 5 minutes at 400° C. to remove solvent and convert the product to a polyimide. These films have excellent mechanical, electrical, thermal and chemical properties as shown by the following test data.

Instron tensile test (25° C.; 50% R.H.; 0.2″/min. cross head speed)
Elongation (at break)—9.5%
Tensile strength (at break)—11,500 p.s.i.
Dielectric break down—4000 volts/mil.
Dissipation factor—0.36% at 25° C./1000 cycles
Dielectric constant—1.5–2.0

After 260 hours heating at 250° C. the films show a weight loss of only 9.3%. The films are unchanged on immersion in water or 0.2/N aqueous solution of sulfuric acid for periods of two weeks at 25° C.

Glass cloth (type S 112–38 F 112 Y 50 wt. 11) is impregnated (6 oz./sq. yd.) with the solution of this example, prebaked 8 minutes at 100° C., then baked one hour at 300° C. under 100 p.s.i.g. pressure between like metal strips of the character below.

The tensile shear stress required to separate the joints is

|  | Stress, p.s.i. | Temperature, ° C. |
| --- | --- | --- |
| Aluminum | 1,600 | 25 |
| Stainless steel | 1,900 | 25 |
|  | 1,550 | 204 |
|  | 1,180 | 288 |
| After aging 100 hours at 260° C. each was | 1,000 | 288 |

The solution of this example is useful as a coating for magnet wire and is applied to #18 copper wire by the use of dies and cured by passing at 25 f.p.m. from the bottom to the top of an 18-foot vertical oven in which the bottom section is heated to 260° C. and the top section to 510° C. Smooth wire coated with 3-mil (increase in diameter) of polyimide is obtained.

EXAMPLE 2

A quantity of 4,4′-oxydianiline (4.0 parts) is dissolved in 17.29 parts of N-methylpyrrolidone. The solution is stirred in a reaction vessel equipped with a thermometer. Phenyltrichlorotricyclo(4.2.2.0$^{2,5}$)-dec - 7 - ene-3,4,9,10-tetracarboxylic dianhydride (1.764 parts) is added in small increments. When the solution becomes homogeneous, the viscosity is measured at 25° C. and found to be 0.21 poise at 25% solids.

An examination of the IR spectrum shows an anhydride absorption due to unreacted anhydride, and an amide-acid absorption from the formation of polyamic acid.

EXAMPLE 3

Tricyclo(4.2.2.0$^{2,5}$)-dec - 7 - ene-3,4,9,10-diethyl ester dicarboxylic acid (20.0 parts) is dissolved in 45.4 parts N-methylpyrrolidone and 0.5 part 2–B anhydrous ethanol. 10.6 parts of 4,4′-methylenedianiline is then added. The resulting solution has a viscosity of less than 1 poise at 40% solids in N-methylpyrrolidone. Films are obtained by casting on a glass or metal plate and baking 5 minutes at 100° C. followed by 4 minutes at 400° C. In order to evaluate this material as an insulating varnish a solution is prepared by mixing 10 parts of this product with 2 parts of a solution of 20 parts of an epoxy novolac resin in 80 parts of N,N-dimethyl acetamide. Helical coils (wound on ¼″ mandrel) of #18 copper wire coated with a polyimide enamel are varnished by dipping in the resulting solution. Solvent is evaporated by baking for one hour at 120° C. between dips. After the final dip the coils are baked for one hour at 120° C., one hour at 150° C. and 4 hours at 200° C. When tested in the Instron tensile tester by breaking as a simple beam at a rate of 0.2 inches/minute the varnished coils show an average bond strength of 34 pounds at 25° C. and 15 pounds at 180° C.

EXAMPLE 4

Tricyclo(4.2.2.0$^{2,5}$)-dec - 7 - ene-3,4,9,10-dimethyl ester dicarboxylic acid (33.8 parts) is dissolved in 100 parts N-methyl pyrrolidone and 20 parts of 4,4'-oxydianiline added. The resulting solution has a viscosity of 0.25 poise at 35% solids in N-methyl pyrrolidone and an inherent viscosity of 0.12, measured at 25° C. after dilution with N,N-dimethyl acetamide to a concentration of 0.5 g./100 ml.

Durable films are prepared from this solution by casting on a glass or metal plate and baking 10 minutes at 100° C. followed by 5 minutes at 400° C.

EXAMPLE 5

The procedure of Example 1 is repeated but using 46.4 parts hexamethylene diamine, in place of the 4,4'-oxydianiline, in 890 parts of N,N-dimethylacetamide. To this solution are added 109.6 parts of tricyclo(4.2.2.0$^{2,5}$)-dec-7-ene-3,4,9,10-tetracarboxylic dianhydride. A precipitate appear during addition of the dianhydride and redissolves on warming to 50–60° C. and stirring for a further 3 hours. The solution is cooled and the viscosity measured at 25° C. and found to be less than 5 poises (at 14.9% solids in N,N-dimethylacetamide). The inherent viscosity measured as in Example 4 is 0.26.

EXAMPLE 6

A quantity of 4,4'-oxydianiline (18.2 parts) is dissolved in 129.6 parts of N-methylpyrrolidone. The solution is stirred in a reaction vessel equipped with a thermometer and with means for cooling. Tricyclo(4.2.2.0$^{2,5}$)-decane-3,4,9,10-tetracarboxylic dianhydride (25.0 parts) prepared by hydrogenation of tricyclo(4.2.2.0$^{2,5}$)-dec-7-ene-3,4,9,10-tetracarboxylic dianhydride is added at a rate to maintain the temperature of the mixture slightly below 35° C. The resulting homogeneous solution has a viscosity of 4 poises at 15% solids (N-methyl pyrrolidone) measured at 25° C.

Films are obtained using the above mentioned homogeneous solution and a 7-mil doctor knife. These are baked 5 minutes at 100° C. and 4 minutes at 400° C. to remove solvent and convert to a polyimide.

EXAMPLE 7

4,4'-methylene dianiline (15.0 parts) and tricyclo(4.2.2.0$^{2,5}$)-dec - 7 - ene-3,4,9,10-tetracarboxylic dianhydride (20.0 parts) are dissolved in 140 parts of cresylic acid. The solution is stirred in a reaction vessel, equipped with a thermometer and a means of heating, for one hour. Additional quantities of tricyclo(4.2.2.0$^{2,5}$)-dec-7-ene-3,4,9,10-tetracarboxylic dianhydride (0.77 parts) and cresylic acid (3.08 parts) are added, the temperature raised to 85° C. and maintained at 85° C. for three hours. The resulting homogeneous solution has a viscosity of 195 poises at 20% solids (cresylic acid) measured at 25° C.

Films are cast from the above homogeneous solution using a 10-mil doctor knife on a glass plate. These are baked 15 minutes at 150° C. followed by 4 minutes at 400° C.

Infrared examination of the film indicates the complete absence of anhydride absorption and amide-acid absorption, and the presence of imide absorption.

EXAMPLE 8

Fluoro-tricyclo(4.2.2.0$^{2,5}$)-dec - 7 - ene-3,4,9,10-tetracarboxylic dianhydride (2.45 parts) and 4,4'-oxydianiline (1.56 parts) are mixed in an Erlenmeyer flask. N-methylpyrrolidone (10.27 parts) is added and the mixture stirred. An exothermic reaction occurs and the temperature of the mixture rises to about 40° C. After about 10 minutes, no insoluble material remains. The resulting brown solution has a viscosity at 25° C. of less than 5 poises (30% solids).

Films are cast and baked in a way similar to Example 1. The films so obtained are flexible and tough.

What is claimed is:

1. A polyamic acid composition consisting essentially of the reaction product of a diamine, having the formula H$_2$N—R$_1$—NH$_2$, where R$_1$ is a divalent radical containing at least two carbon atoms selected from the group consisting of saturated aliphatic carbocyclic aromatic, carbocyclic alicyclic, and mixtures thereof, and a dianhydride having the following structural formula:

[structural formula showing dianhydride with substituents R$_2$ through R$_{11}$]

where R$_2$–R$_7$ are individually selected from the group consisting of H, (C$_1$–C$_6$)-alkyl, Cl and F; R$_8$–R$_{11}$ are individually selected from the group H, CH$_3$, Cl and F, said polyamic acid composition having an inherent viscosity of at least 0.1, measured as a 0.5% by weight solution in N,N-dimethyl acetamide at 30° C.

2. A film forming polyimide consisting essentially of recurring structural units of the formula:

[structural formula of polyimide repeating unit with R$_1$']

wherein R$_1$ is a divalent radical selected from the group consisting of saturated aliphatic, carbocyclic aromatic, carbocyclic alicyclic, and mixtures thereof.

3. The composition of claim 1 where R$_2$ to R$_{11}$ are hydrogen, and the diamine is oxydianiline.

4. The composition of claim 1 wherein R$_2$ to R$_{11}$ are hydrogen, and the diamine is methylene dianiline.

5. The composition of claim 3 having a solution viscosity of less than about 30 poises at a concentration of at least 15% solids in a solvent from the group consisting of dimethylformamide, dimethylacetamide, N-methylpyrrolidone, dimethylsulfoxide, and mixtures thereof.

6. The composition of claim 4 having a solution viscosity of less than about 30 poises at a concentration of at least 25% solids in a solvent from the group consisting of dimethylformamide, dimethylacetamide, N-methylpyrrolidone, dimethylsulfoxide, and mixtures thereof.

References Cited

UNITED STATES PATENTS

| | | | |
|---|---|---|---|
| 3,179,631 | 4/1965 | Endrey | 260—78 TF |
| 3,179,633 | 4/1965 | Endrey | 260—78 TF |
| 3,179,634 | 4/1965 | Edwards | 260—78 TF |

HAROLD D. ANDERSON, Primary Examiner

U.S. Cl. X.R.

117—128, 161 P; 260—30.2, 30.8 DS, 32.2, 32.6 N, 33.4 R, 37 N, 65, 78 TF